US011575253B2

(12) United States Patent
Chowdhury et al.

(10) Patent No.: US 11,575,253 B2
(45) Date of Patent: Feb. 7, 2023

(54) CONTROLLED THREE-POLE CLOSE FOR TRANSMISSION LINES

(71) Applicant: Schweitzer Engineering Laboratories, Inc., Pullman, WA (US)

(72) Inventors: Ritwik Chowdhury, Charlotte, NC (US); Gabriel Benmouyal, Boucherville (CA); Carolyn Sun, Charlotte, NC (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 364 days.

(21) Appl. No.: 16/872,636

(22) Filed: May 12, 2020

(65) Prior Publication Data

US 2021/0359503 A1 Nov. 18, 2021

(51) Int. Cl.
| | |
|---|---|
| *H02H 1/00* | (2006.01) |
| *H02H 3/02* | (2006.01) |
| *G05B 9/02* | (2006.01) |
| *G05B 17/02* | (2006.01) |

(52) U.S. Cl.
CPC .............. *H02H 3/021* (2013.01); *G05B 9/02* (2013.01); *G05B 17/02* (2013.01); *H02H 1/0007* (2013.01)

(58) Field of Classification Search
CPC ........ H02H 3/021; H02H 1/0007; G05B 9/02; G05B 17/02
See application file for complete search history.

(56) References Cited

U.S. PATENT DOCUMENTS

| | | | |
|---|---|---|---|
| 2,209,810 | A | 7/1940 | Cordray |
| 3,401,304 | A | 9/1968 | Woodworth |
| 3,546,534 | A | 12/1970 | Kotos |
| 3,558,984 | A | 1/1971 | Smith |
| 4,322,768 | A | 3/1982 | Maeda |
| 4,757,263 | A | 7/1988 | Cummings |
| 4,914,382 | A | 4/1990 | Douville |
| 5,367,426 | A | 11/1994 | Schweitzer, III |
| 5,418,776 | A | 5/1995 | Purkey |
| 5,430,599 | A | 7/1995 | Charpentier |
| 5,627,415 | A | 5/1997 | Charpentier |
| 5,671,112 | A | 9/1997 | Hu |
| 5,703,745 | A | 12/1997 | Roberts |
| 5,805,395 | A | 9/1998 | Hu |
| 6,028,754 | A | 2/2000 | Guzman |
| 6,256,592 | B1 | 7/2001 | Roberts |
| 6,341,055 | B1 | 1/2002 | Guzman-Casillas |
| 6,356,421 | B1 | 3/2002 | Guzman-Casillas |
| 6,456,947 | B1 | 9/2002 | Adamiak |
| 6,518,767 | B1 | 2/2003 | Roberts |
| 6,571,182 | B2 | 5/2003 | Adamiak |
| 6,590,397 | B2 | 7/2003 | Roberts |
| 6,879,917 | B2 | 4/2005 | Turner |

(Continued)

*Primary Examiner* — Mark A Connolly
(74) *Attorney, Agent, or Firm* — Bradley W. Schield; Richard M. Edge (57) ABSTRACT

Systems and methods to estimate trapped charge for a controlled automatic reclose of a power line using a ganged switching device are described herein. For example, an intelligent electronic device (IED) may calculate a voltage amount associated with trapped charge of each phase of a power line based on voltage measurements of the power line. The IED may send a signal to close a ganged switching device at a time based at least in part on the trapped charge of each phase of a power line.

17 Claims, 8 Drawing Sheets

(56) References Cited

U.S. PATENT DOCUMENTS

| | | | |
|---|---|---|---|
| 6,919,717 | B2 | 7/2005 | Ghassemi |
| 7,345,863 | B2 | 3/2008 | Fischer |
| 7,425,778 | B2 | 9/2008 | Labuschagne |
| 7,469,190 | B2 | 12/2008 | Bickel |
| 7,472,026 | B2 | 12/2008 | Premerlani |
| 7,812,615 | B2 | 10/2010 | Gajic |
| 8,289,668 | B2 | 10/2012 | Kasztenny |
| 8,553,379 | B2 | 10/2013 | Kasztenny |
| 8,878,391 | B2 | 11/2014 | Taylor |
| 9,008,982 | B2 | 4/2015 | Tziouvaras |
| 9,379,535 | B2 | 6/2016 | Taylor |
| 10,418,201 | B2 | 9/2019 | Haes |
| 2001/0012984 | A1 | 8/2001 | Adamiak |
| 2002/0101229 | A1 | 8/2002 | Roberts |
| 2007/0070565 | A1 | 3/2007 | Benmouyal |
| 2007/0252599 | A1 | 11/2007 | Zhou et al. |
| 2009/0059447 | A1 | 3/2009 | Gajic |
| 2009/0091867 | A1 | 4/2009 | Guzman-Casillas |
| 2010/0002348 | A1 | 1/2010 | Donolo |
| 2013/0234731 | A1* | 9/2013 | Tziouvaras ............ G01R 15/06 324/658 |
| 2014/0002944 | A1 | 1/2014 | Menezes |
| 2015/0179365 | A1 | 6/2015 | Parapurath et al. |
| 2017/0358404 | A1 | 12/2017 | Talluri |

* cited by examiner

CONTROLLED THREE-POLE CLOSE FOR TRANSMISSION LINES

TECHNICAL FIELD

The present disclosure relates generally to estimating trapped charge on a power line and, more particularly, to estimating the trapped charge for a controlled, three-pole automatic reclose.

BRIEF DESCRIPTION OF THE DRAWINGS

Non-limiting and non-exhaustive embodiments of the disclosure are described herein, including various embodiments of the disclosure with reference to the figures listed below.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Electric power delivery systems include equipment, such as generators, power lines, and transformers, to provide electrical energy from sources to loads. Various intelligent electronic devices (IEDs) may be used in monitoring, control, and protection of the power delivery system. For example, IEDs may obtain voltage measurements and/or current measurements and send signals to circuit breakers (CBs) to disconnect power lines to protect the electric power delivery system from exceeding designed operating conditions due to faults.

Some CBs operate with individual pole switching which allows for each of the poles of the CB to be closed independent of the other poles. In other configurations, ganged switching devices may be used in which the three poles of the CB are closed together. When CBs are opened, electric charge may be trapped on the power line. While some faults are persistent and remain on the power line, other faults are temporary and may be resolved with power being disconnected by opening the CB for a period of time and restored by automatically closing the CB.

When the CB is subsequently closed, a voltage difference between the disconnected power line and the voltage of the power system may cause transients (e.g., traveling waves). If the line is energized during a high-speed auto-reclose at an unfavorable point-on-wave (POW), transient over-voltages on the line may occur resulting in a flashover and failure to energize the line. If the fault was temporary, the arc associated with the fault may also be re-energized if the transient over-voltage is large enough. Further, other issues, such as surge arrester operations may occur.

As explained below, a technique for performing a three-pole close of a ganged switching device for a power line may be used to reduce transient over-voltages on the power line. For example, an IED may determine an amount of trapped charge on each phase of the power line based on voltage measurements. The IED may control operation of the CB based on the amount of trapped charge. For instance, the IED may determine the POW that minimizes the difference between the bus voltage and the line voltage (due to the trapped charge) on the phases together to minimize transient over-voltages during a three-pole close.

Figure 1:
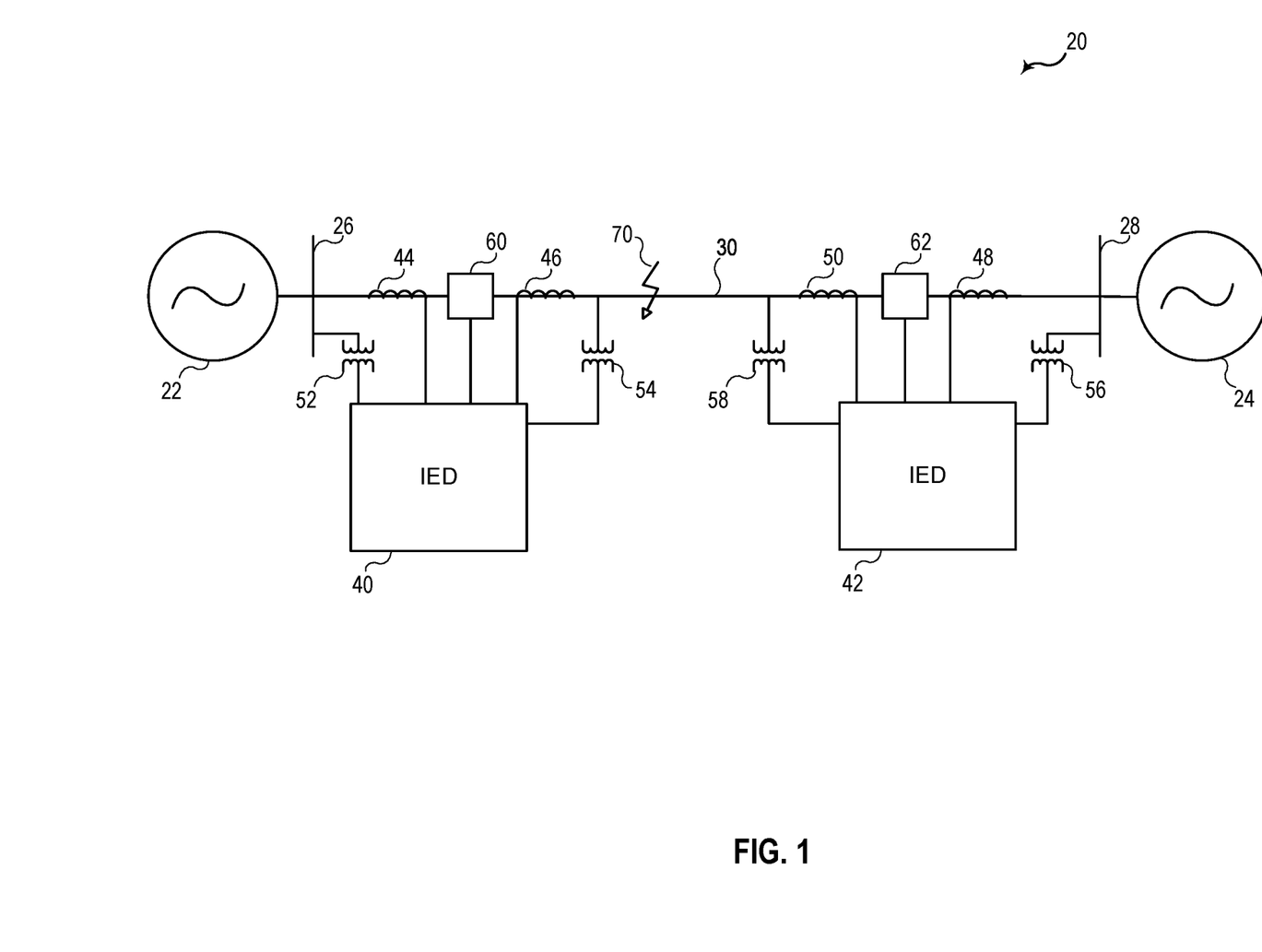
FIG. 1 is a one-line diagram of an electric power delivery system having an intelligent electronic device (IED) that determines the trapped charge of a power line, in accordance with an embodiment.

FIG. 1 is a one-line diagram of a power system 20 that includes power sources 22 and 24 that provide power to one or more loads. The power system 20 includes a power line 30, such as a transmission line, distribution line, or other power line, that connects a local terminal 26 and a remote terminal 28. The terminals 26 and 28 may be buses in a transmission system supplied by power sources 22 and 24. Although illustrated in single-line form for purposes of simplicity, power system 20 may be a multi-phase system, such as a three-phase electric power delivery system.

The power system 20 is monitored by a local IED 40 and a remote IED 42 located at the local terminal 26 and the remote terminal 28 respectively, although additional IEDs may also be utilized to monitor other locations of the system. As used herein, an IED (such as IEDs 40 and 42) may refer to any microprocessor-based device that monitors, controls, automates, and/or protects monitored equipment within the power system 20. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs. IEDs 40 and 42 may obtain electric power system information using current transformers (CTs) 44, 46, 48, and 50, and capacitor voltage transformers (CVTs) 52, 54, 56, and 58. The IEDs 40 and 42 may detect fault events on the power line 30 using current and voltage signals from the CTs 44 and 46 and/or the PTs 48 and 50. In some embodiments, the IEDs 40 and 42 may communicate power system data via a communication link between the IEDs 40 and 42.

When a fault 70 occurs on the power line 30, the IEDs 40 and 42 may detect, for example, an overcurrent on the power line via the CTs 44 and 46. The IEDs 40 and 42 may send a signal to the CBs 60 and 62 to trip the breakers, thereby disconnecting the power line 30 from the power sources 22 and 24.

The IEDs 40 and 42 may send signals to the CBs 60 and 62 to trip at different times. For example, the remote CB 62 may be disconnected before the local CB 60 due to a lower threshold overcurrent, a lower threshold current-over-time, a faster trip time, or detecting the overcurrent first. Upon disconnecting the remote CB 62, the power line 30 may remain energized by the power being delivered from the power source 22. Due to the fault 70, the IED 40 may then disconnect the CB 60. When the CB 60 is disconnected, charge may remain on the power line 30 across the capacitance of the line, referred to as trapped charge.

Figure 2:
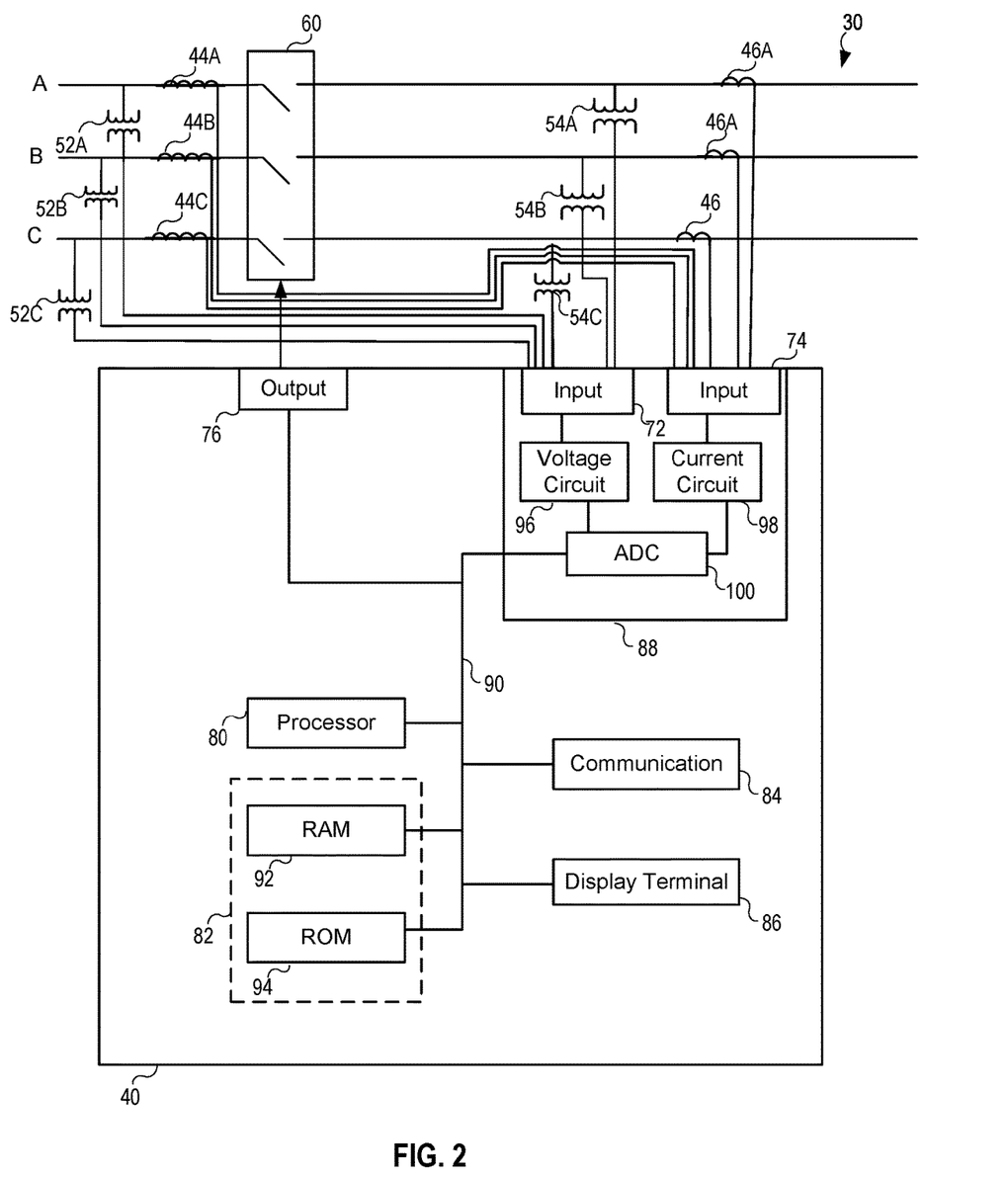
FIG. 2 is a block diagram of the IED of FIG. 1, in accordance with an embodiment.

FIG. 2 is a block diagram of the IED 40 connected to a CB 60. The IED 40 may open the CB 60 due to an event on the power line and estimate trapped charge on each phase A-C of the power line 30. The IED 40 may be connected to CTs 44A-C and 46A-C and CVTs 52A-C and 54A-c via inputs 72 and 74 to allow the IED 40 to receive signals of electrical conditions (e.g., voltage and current). The IED 40 may be connected to the CB 60 via the output 76 to allow the IED 40 to send a signal to the CB 60 to open the CB 60. The inputs 72 and 74 and output 76 may refer to ports, connectors, pins, and the like, used to connect the IED 40 to other devices.

The IED 40 may further include one or more processors 80, a computer-readable medium (e.g., memory 82), a communication interface 84, a display terminal 86, and detection circuitry 88 communicatively coupled to each other via one or more communication buses 90 The processor 80 may be embodied as a microprocessor, a general-purpose integrated circuit, an application specific integrated circuit (ASIC), a field programmable gate array (FPGA), and/or other programmable logic devices. It should be noted that the processor 80 and other related items in FIG. 2 (e.g., the memory 82) may be generally referred to herein as "processing circuitry." Furthermore, the processing circuitry may be a single contained processing module or may be incorporated wholly or partially within any of the other elements within the IED 40. It should be noted that FIG. 2 is merely one example of a particular implementation and is intended to illustrate the types of components that may be present in the IED 40.

In the IED 40 of FIG. 2, the processor 80 may be operably coupled with the memory 82 to perform various algorithms. Such programs or instructions executed by the processor 80 may be stored in any suitable article of manufacture that includes one or more tangible, computer-readable media at least collectively storing the instructions or routines, such as the random-access memory (RAM 92) and the read-only memory (ROM 94).

In the illustrated embodiment, the IED 40 includes detection circuitry 88 that detects various electrical conditions of the power line based on the input signals. The detection circuitry 88 may include a voltage conversion circuit 96 (e.g., transformer) and a circuit conversion circuit 98 (e.g., transformer) that transform the input signals to levels that may be sampled by the IED 40. The detection circuitry 88 may include analog-to-digital converter(s) 100 that sample the current and voltage signals and produce digital signals representative of measured current and measured voltage on the power line, which may be transmitted to the processor 80. The IED 40 may compare the current and/or voltage to thresholds to detect faults and to disconnect the power line 30 from the power source 22. For example, if current on one or more phases A-C exceeds a preset threshold and/or current-over-time exceeds a preset threshold, the processor 80 may detect a fault event on the power line 30 and send a signal to open the CB 60.

The communication interface 84 may include a fiber optic transceiver that communicates with another IED, such as the remote IED 42, to receive signals indicating one or more measurements from the other IED While the illustrated embodiment communicates with the remote IED 42, in other embodiments, the IED 42 may communicate with many devices or may operate as an independent device without communication. In some embodiments, the IED 40 may include a display terminal 86 to allow operators to review events on the power line 30, change settings, etc.

The IED 40 may detect a fault event on the power line 30. Some faults are temporary faults that may be cleared by opening the CB 60 and waiting for a period of time. As a result, the IED 40 may subsequently attempt to reclose the CB 60 after a period of time to allow the power line 30 to continue to provide power to loads.

Due to the trapped charge on the power line 30, there may be a voltage difference between the power line 30 and the power being provided by the power source 22, which upon closing CB 60 may cause voltage transients (e.g., traveling waves). Depending on the line characteristics, the voltage transients may exceed the expected operating conditions of the power line 30. In some cases, the voltage transients may cause what would otherwise be a temporary fault to become a persistent fault that remains on the power line 30 due to re-energizing the fault or exceeding the designed power line ratings.

As explained below, the amount of trapped charge of each phase A-C of the power line 30 may be estimated by the IED 40 using the voltage measurements received from the CVTs 54A-C. The trapped charge of each of the phases A-C may then be used to obtain a closing point-on-wave (POW) at which to send a close signal to the CB 60 during the reclose process. The CB 60 may be a ganged switching device that opens and closes the three poles of the power line together based on a single open or close signal from the IED 40.

Figure 3:
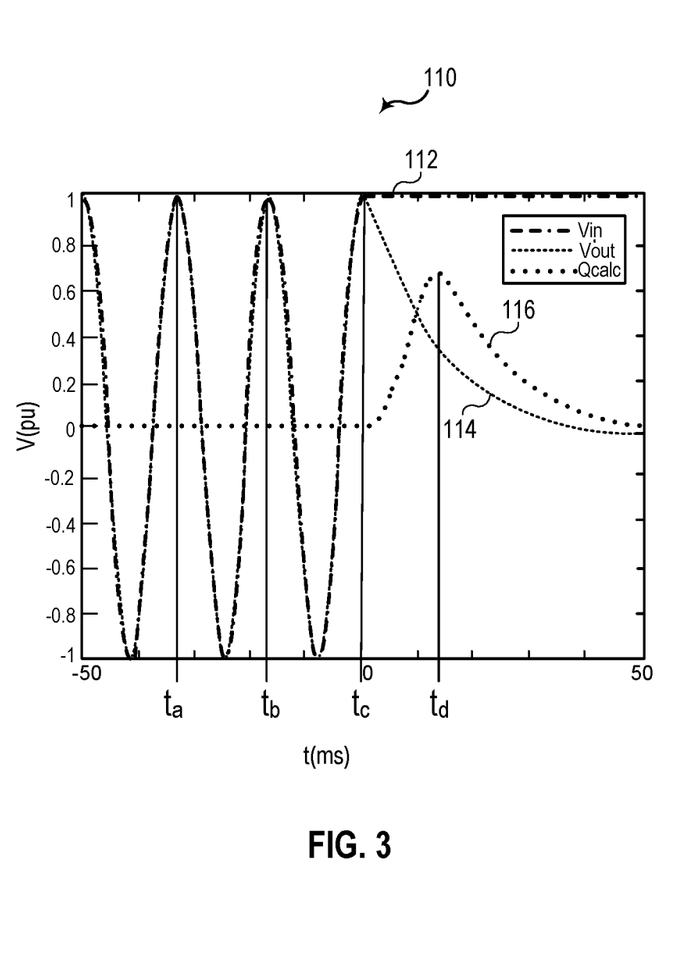
FIG. 3 is a plot of voltage and trapped charge obtained by the IED of FIG. 1, in accordance with an embodiment.

FIG. 3 is a plot 110 of the actual voltage signal 112, the measured voltage signal 114, and the trapped charge signal 116 on a phase of the power line 30. At time $t_c$, the power line 30 is disconnected from the power source 22 by opening the CB 60. The voltage signal 112 represents the actual voltage on the power line 30 following disconnection of the power line 30 from the power system. The voltage signal 114 represents the measured voltage from the CVT 54.

The charge signal 116 represents potential trapped charge ($Q_{calc}$) values that are calculated by summing the voltages over a cycle. That is, the IED 40 may integrate the voltage signal 114 repeatedly over a cycle from the present time to obtain the $Q_{calc}$ signal 116. For example, integrating the voltage signal 114 over a cycle from $t_a$ to $t_b$ results in the $Q_{calc}$ signal 116 at $t_b$, which is zero. At time $t_c$, the sum of the voltages may begin to increase as the voltage signal 114 from the CVT 54 stops oscillating due to opening the CB 60. The summation of the voltages may reach a peak at time $t_d$. As explained below, the IED 40 may determine the trapped charge on the power line 30 as being the maximum of the potential trapped charge values of the $Q_{calc}$ signal 116.

Figure 4:
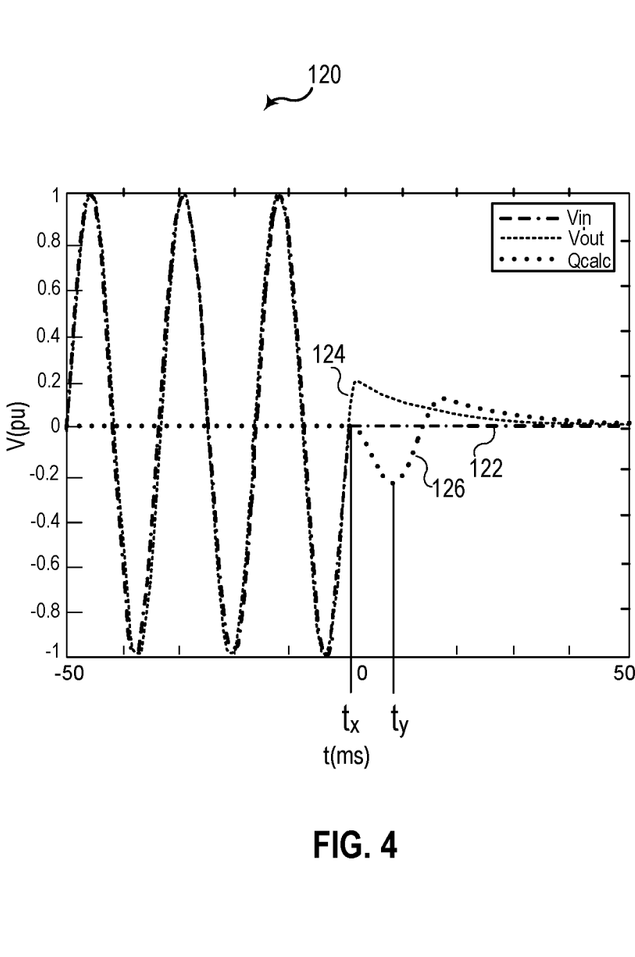
FIG. 4 is another plot of voltage and trapped charge obtained by the IED of FIG. 1, in accordance with an embodiment.

FIG. 4 is another plot 120 of the actual voltage signal 122, the measured voltage signal 124 detected via one of the CVT 54A-C, and the trapped charge signal 126 from the IED 40 in an example in which the CB 60 is opened at zero volts per-unit at time $t_x$. By summing the voltages, a maximum amplitude of the trapped charge calculation may be obtained at time $t_y$ (shown as −0.24).

Figure 5:
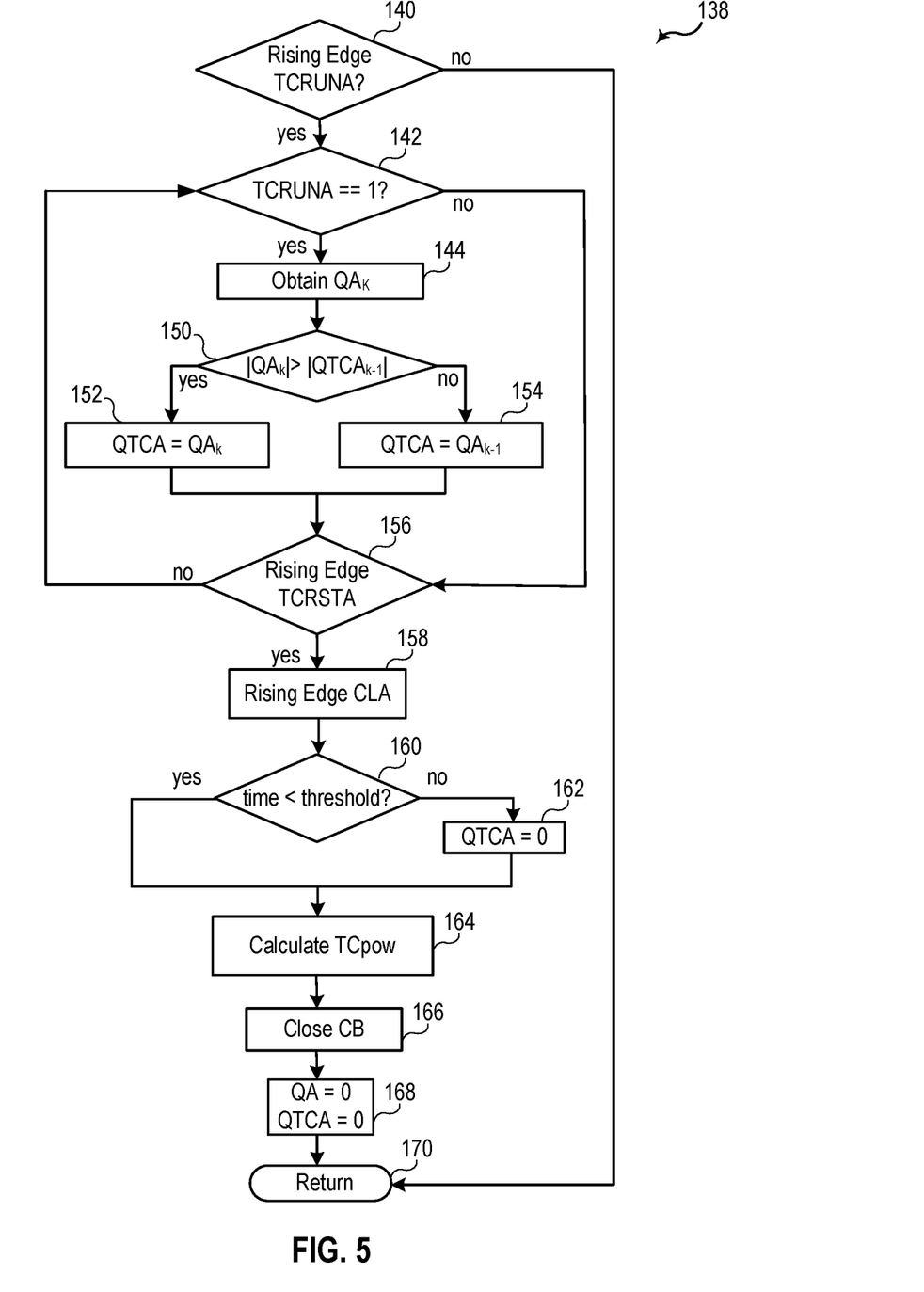
FIG. 5 is a flow chart of a process performed by the IED of FIG. 1 to estimate the trapped charge and perform a three-pole close of a circuit breaker (CB) at a time based on the estimated trapped charge, in accordance with an embodiment.

FIG. 5 is a flow diagram of a process 138 that may be performed by the IED 40 to determine the amount of trapped charge on the A-phase of the power line 30 and to close the three poles of a ganged switching device, such as CB 60, together at a time that reduces or minimizes transients caused by differences in the power system voltage and power line voltage due to trapped charge. The process 138 may be performed by the processor 80 by executing instructions (e.g., code) stored in the memory 82.

The IED 40 may obtain settings, such as system phase rotation (PHROT), nominal frequency (NFREQ), and breaker parameters of the three phases, such as TClose (close time in ms) and TCarc (arc time in degrees) (block 140). In some embodiments, TClose and TCarc may not be used if the breaker has no differences between the closing times of the three poles.

The process 138 begins with detection that the CB 60 has opened. For example, the CB 60 may be opened to prevent overcurrents, overvoltages, or other conditions on the power line 30. Upon opening the CB 60, the processor 80 may detect a rising edge of a trapped charge algorithm assertion (diamond 142). The rising edge of a trapped charge run algorithm assertion of the A-phase (TCRUNA) may refer to a signal that is asserted when the power line 30 is energized (e.g., in steady state) and the CB 60 is tripped. Upon assertion in which TCRUNA is true (diamond 144), the processor 80 may calculate potential trapped charge values of the A-phase based on the voltage measurements from the CVT 54 using the process described with respect to FIG. 6.

Figure 6:
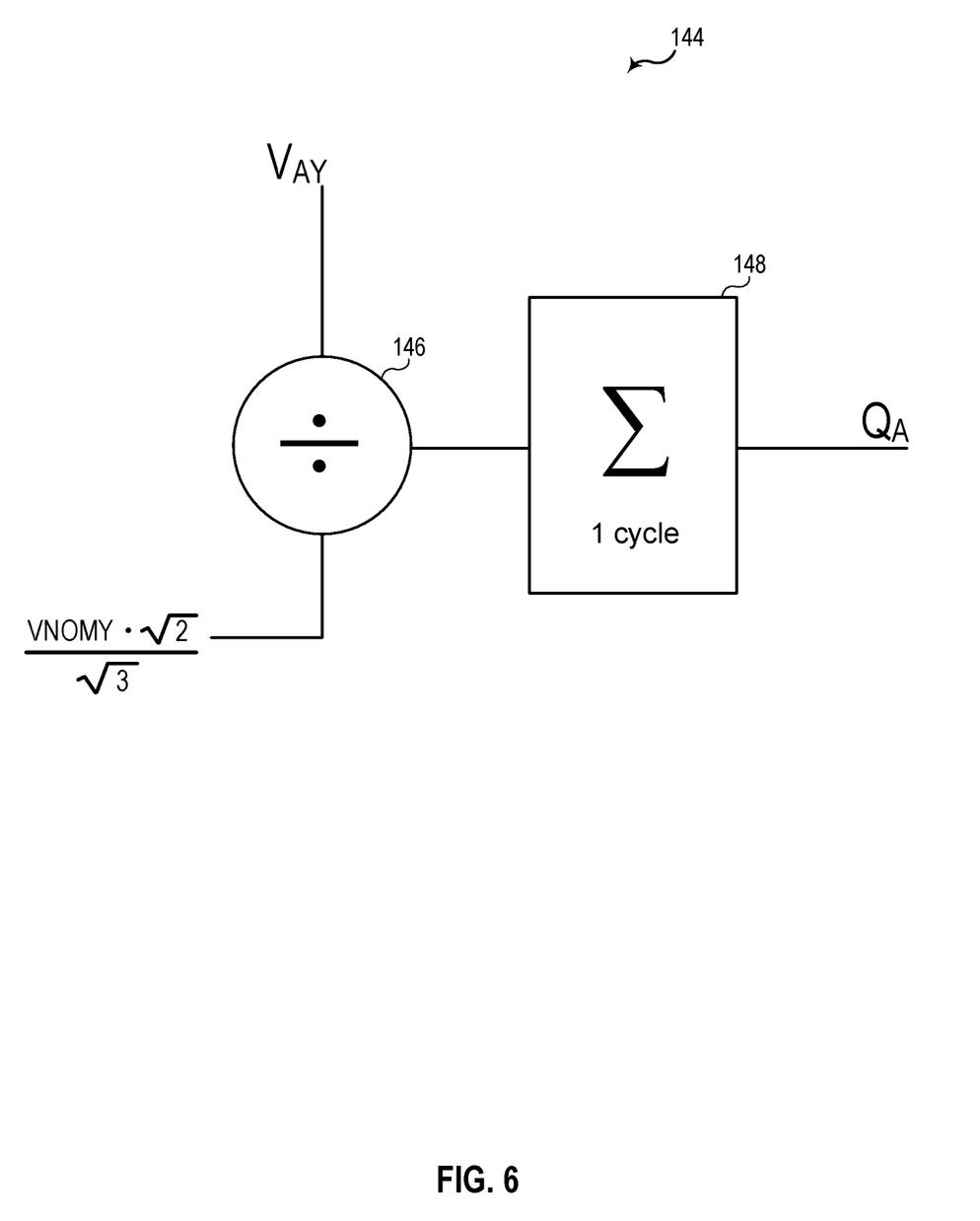
FIG. 6 is a flow diagram performed by the IED of FIG. 1 to estimate the trapped charge, in accordance with an embodiment.

FIG. 6 is a diagram of a technique that may be used to estimate a potential trapped charge value of the A-phase of the power line 30 (block 146). While the process is described with respect to the A-phase of a three-phase system, a similar process may be performed on the B-phase and C-phase. As illustrated, the A-phase voltage (VAY) may be divided, at divider 148, by the nominal voltage (VNOMY) and a factor to obtain a per-unit voltage. The calculations may be summed at summation 150 over a cycle to determine the A-phase charge (QA) at time k.

Returning to FIG. 5, the processor 80 may then compare the magnitude of the calculated $QA_K$ with the magnitude of a maximum value of trapped charge (QTCA) (diamond 152). If the calculated magnitude of $QA_K$ exceeds the magnitude of the maximum value of the trapped charge, the maximum value of trapped charge may be updated to be $QA_K$ (block 154). If the calculated $QA_K$ falls below QTCA, the previous QTCA value may be maintained (block 156). This process may be repeated until a reset signal (TCRSTA) is detected (diamond 158). For example, the trapped charge process of steps 142-156 may be run for 12 cycles, at which point TCRSTA is set to be asserted. By repeating steps 142-156 repeatedly over time, the processor 80 may obtain an overall maximum value of trapped charge when the CB 60 is tripped. That is, the processor 80 may select the maximum trapped charge value from each of the calculated potential trapped charge values (i.e., summed voltages over a cycle) to be used as the estimated trapped charge of the A-phase. The estimation process of steps 142-156 may be repeated for each of the remaining phases of the power system.

The processor 80 may detect a rising edge CLA signal indicating that the IED 40 may close the CB 60 (block 160). For example, a predetermined time (e.g., 12 cycles) may pass prior to receiving the rising edge CLA signal asserting that sufficient time for transient faults to clear has passed. Depending on the amount of time that passes (diamond 162), QTCA may be reset to zero (block 162). That is, if enough time passes (e.g., 10 seconds), the trapped charge on the power line 30 may be set to zero (block 164). Upon determining the estimated trapped charge of each of the phases, the IED 40 may determine a point-on-wave to close the CB 60 (block 166).

Upon determining the estimated trapped charge of each of the phases (i.e., $Q_A$, $Q_B$, and $Q_C$), the processor 80 may determine the POW at which to close the CB 60. The processor 80 may calculate the POW for the A-phase, B-phase, and C-phase while accounting for ganged operational delays of CB 60 using the following equations:

$$A = \sin(POW) \qquad \text{Eq. 1}$$

$$B = \sin(POW - a + GODLYB) \qquad \text{Eq. 2}$$

$$C = \sin(POW + a + GODLYC) \qquad \text{Eq. 3}$$

where A, B, and C refer to the voltage magnitude at a given POW. The voltages across each phase is calculated as a function of POW, which ranges from 0 to 360 degrees via equations (1)-(5). If the system phase rotation (PHROT) is "ABC", a is 120°, otherwise a is −120°. The ganged operational delay of the B and C phases of CB 60 are shown via equations (4) and (5):

$$GODLYB = \left(\frac{TCloseB - TCloseA}{1000} * NFREQ * 360\right) - (TCarcB - TCarcA) \qquad \text{Eq. 4}$$

$$GODLYC = \left(\frac{TCloseC - TCloseA}{1000} * NFREQ * 360\right) - (TCarcC - TCarcA) \qquad \text{Eq. 5}$$

where NFREQ is the nominal frequency, TClose is the switching close time of the respective pole of the CB 60 and TCarc is the arc time of the respective pole of the CB 60.

As mentioned above, each of these values (e.g., NFREQ, TClose, and TCarc) may be settings of the system (e.g., input via a user during commissioning). The voltage magnitudes across each phase may be calculated at several potential closing POWs using equations 1-5 throughout the range (e.g., 0 to 360 degrees). The maximum difference is then calculated using equation (6) which finds the difference between the calculated trapped charge and the voltage magnitudes of the potential closing POWs.

$$DIF = \max(|A - Q_A|, |B - Q_B|, |C - Q_C|) \qquad (6)$$

where A, B, and C are the per unit voltages of the A, B, and C phases at the potential closing POWs and $Q_X$ is the per-unit amount of trapped charge on the X phase. That is, the processor 80 may calculate a maximum difference value (DIF), at several potential closing POWs, as a maximum of the difference between the voltage on the A-phase and the amount of trapped charge of the A-phase, the difference between the voltage on the B-phase and the amount of trapped charge on the B-phase, and the difference between the voltage on the C-phase and the trapped charge on the C-phase.

The POW that results in the minimum value of DIF is then used to generate TCpowA, B and C via equations (7)-(9):

$$TCPOWA = POW \qquad \text{Eq. 7}$$

$$TCPOWB = POW - a + GODLYB \qquad \text{Eq. 8}$$

$$TCPOWC = POW + a + GODLYC \qquad \text{Eq. 9}$$

Upon determining the estimated trapped charge of each of the phases, the IED 40 may determine a trapped charge closing point-on-wave (TCPOW) to send a close signal to the CB 60 (block 164).

The quantities TCpowA, TCpowB and TCpowC are the POW with respect to the voltage zero crossings of the corresponding phases where the auto-reclose is executed. From equations (7)-(9), they result in the same instant of time. Some general analysis of various fault types exhibits the use of this algorithm and the benefits of using this logic.

Figure 7:
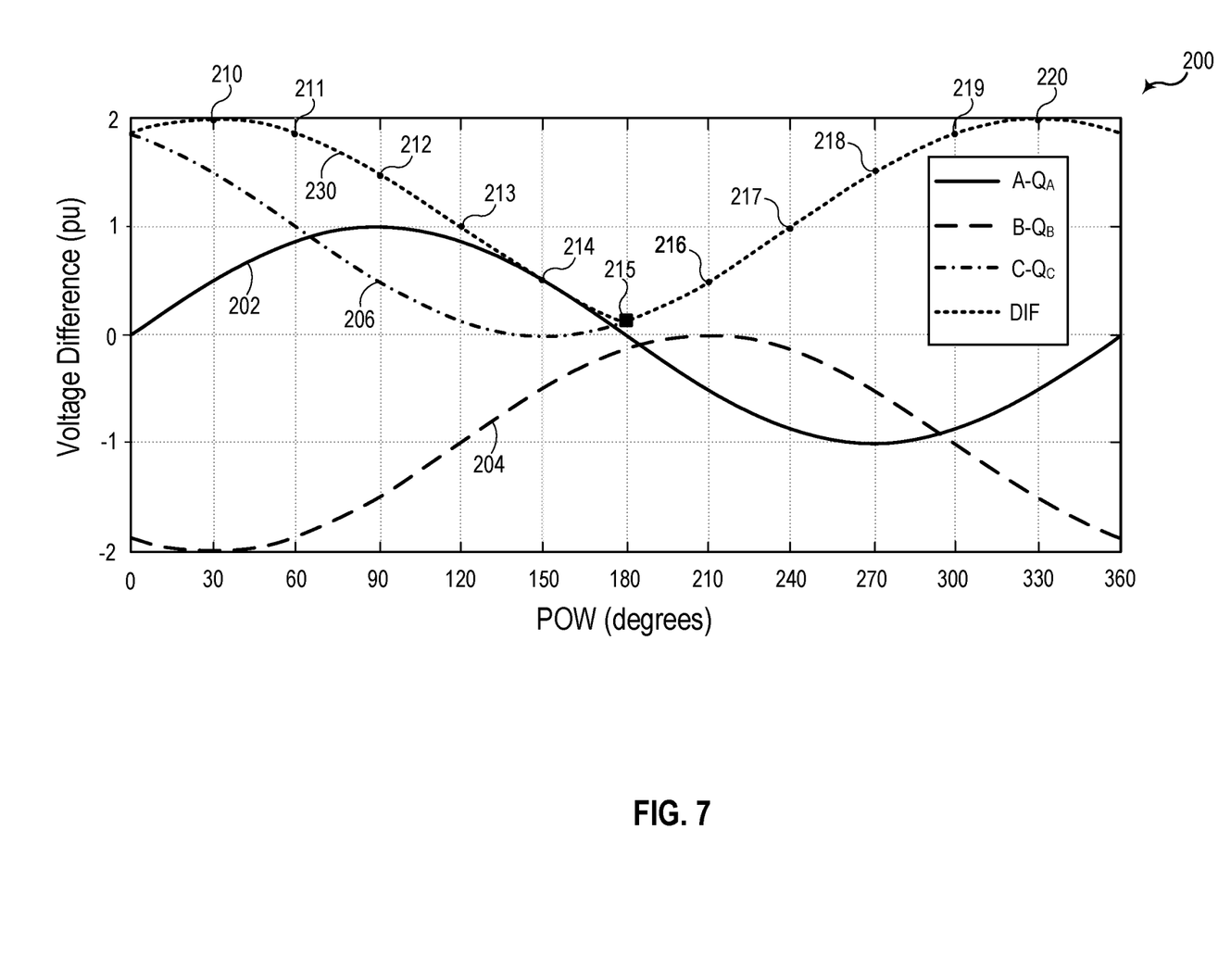
FIG. 7 is a plot of voltage difference signals from an AG fault monitored by the IED of FIG. 1, in accordance with an embodiment.

FIG. 7 is a plot 200 of voltage difference signals $|A-Q_A|$ 202, $|B-Q_B|$ 204, and $|C-Q_C|$ 206, that represent the difference between the per-unit voltage on each phase of the remaining energized power line and the per-unit trapped charge ($Q_X$) from an A–G fault. The trapped charge on Phase A would likely be zero as the ground fault shunts the trapped charge away. Phase B may have a +1 p.u. trapped charge ($Q_B$), with Phase C with a −1 p.u. trapped charge ($Q_C$).

In some embodiments, the processor 80 may calculate a set of DIF values 210-220 to form the DIF signal 230. In other embodiments, the IED 40 may include hardware that generates the DIF signal 230 based on the comparisons described in equations 1-6. The processor 80 may determine the minimum of the DIF signal 230 to determine a POW at which to close the CB to minimize transients caused by the differences. The output of the process 138 in the illustrated example is TCPoWA=180°, TCPoWB=60° and TCPoWC=300°. The maximum difference for each phase in this example is 0.134 pu.

Figure 8:
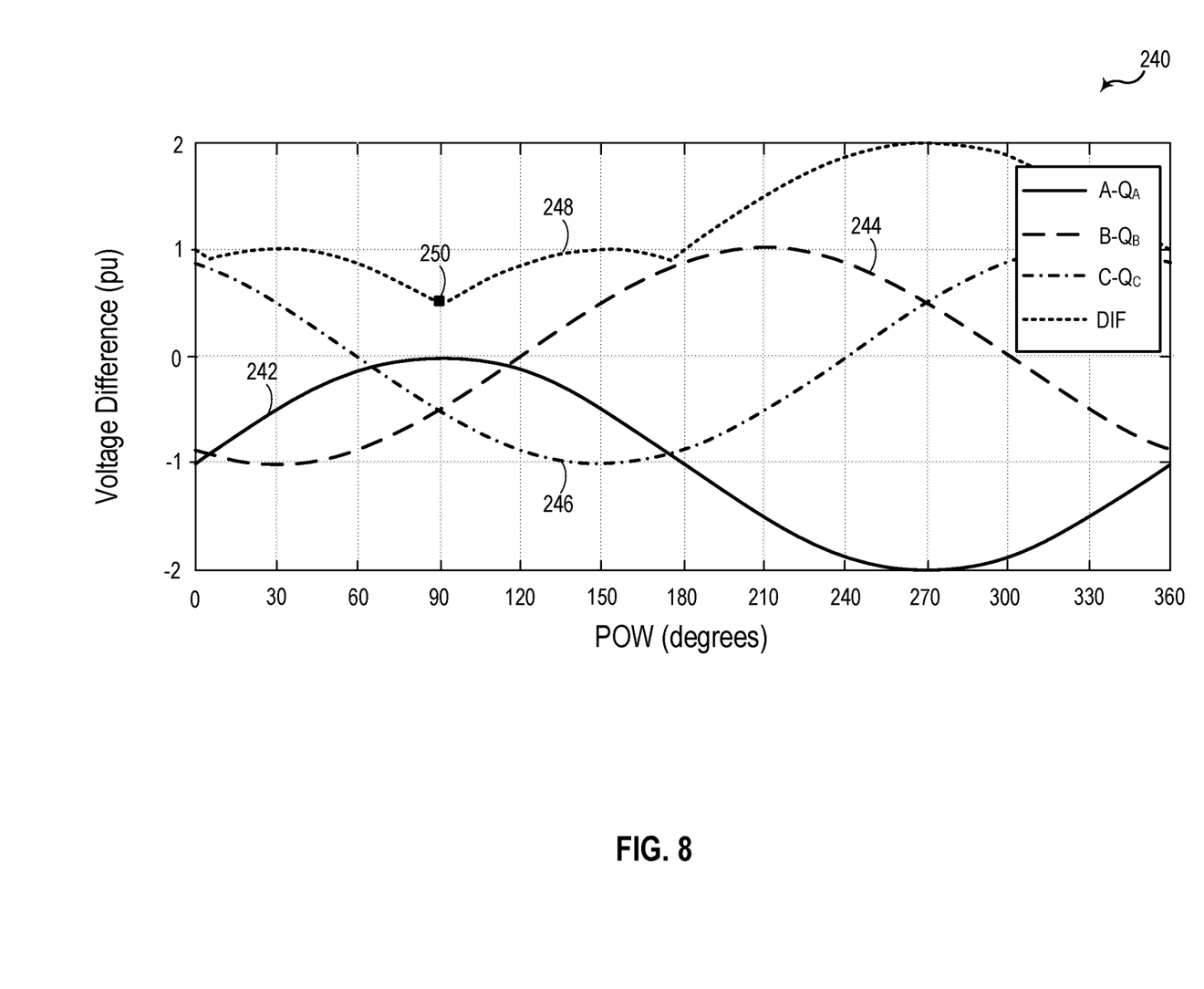
FIG. 8 is a plot of voltage difference signals from a BCG fault monitored by the IED of FIG. 1, in accordance with an embodiment.

FIG. 8 is a plot 240 of voltage difference signals $|A-Q_A|$ 242, $|B-Q_B|$ 244, and $|C-Q_C|$ 246 from a BC/BCG fault. For a BC/BCG fault, the trapped charge may correspond to $Q_A$=+1 pu, $Q_B$=0 pu, $Q_C$=0 pu. The output of the algorithm is TCPoWA=90°, TCPoWB=330°, TCPoWC=210° and the maximum voltage difference on any phase is 0.5 pu, as indicated at point 250 on DIF signal 248.

Figure 9:
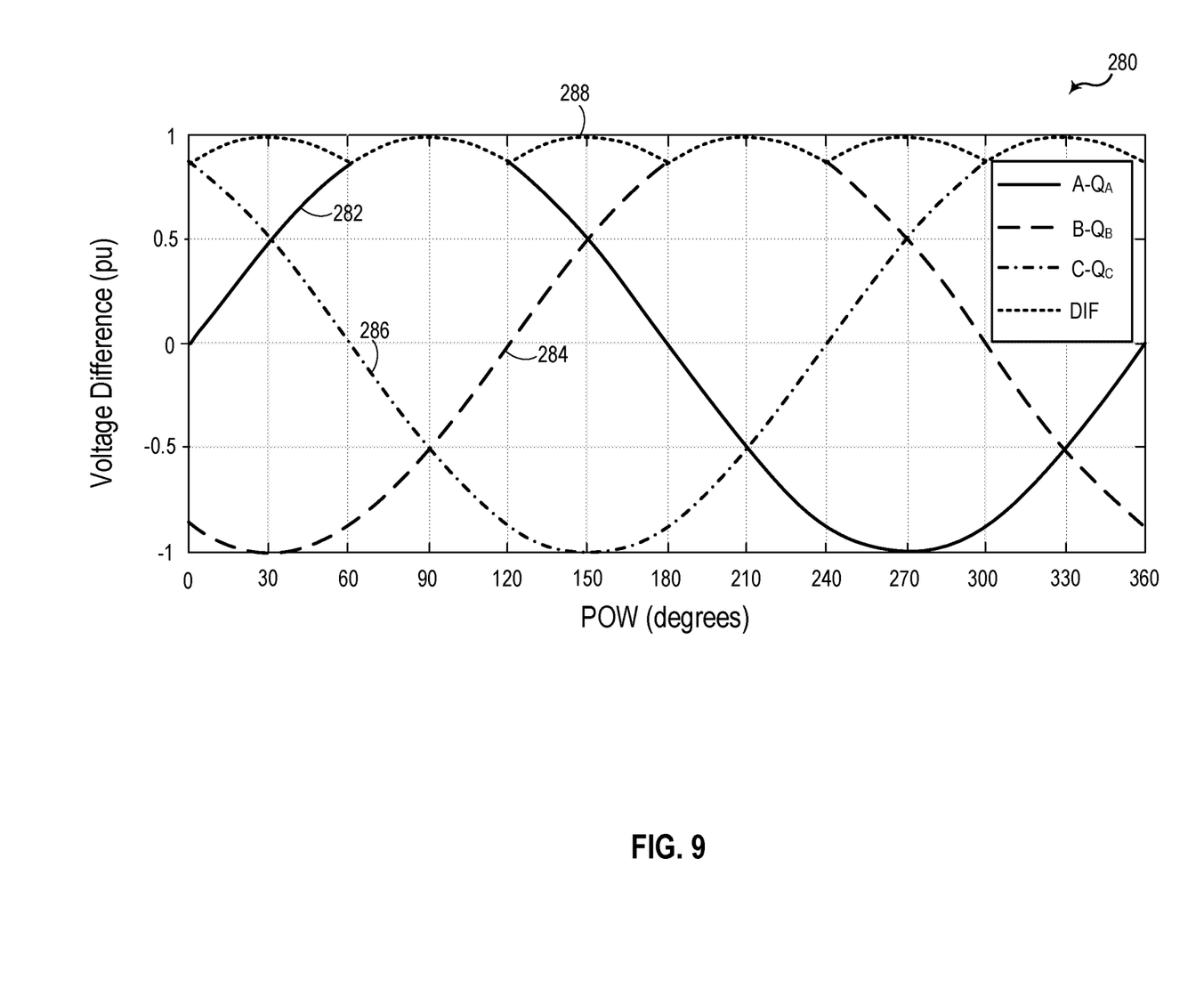
FIG. 9 is a plot of voltage difference signals from an ABCG fault monitored by the IED of FIG. 1, in accordance with an embodiment.

FIG. 9 is a plot 280 of voltage difference signals $|A-Q_A|$ 282, $|B-Q_B|$ 284, and $|C-Q_C|$ 288 from an ABC/ABCG fault. In the illustrated embodiment, the trapped charge for an ABC/ABCG fault or a closing operation may be $Q_A$=0 pu, $Q_B$=0 pu, $Q_C$=0 pu. The output of the algorithm is TCPoWA=90°, TCPoWB=330°, TCPoWC=210° and the maximum voltage difference on any phase is 0.866 pu, as indicated by DIF signal 288.

Returning to FIG. 5, the processor 80 may send a close signal to the CB 60 to close the CB 60 at the time (TCPOW) that minimizes the maximum voltage difference between the voltage of the remaining energized line and the trapped charge. The processor 80 may then reset the trapped charge values QX and QTCX for each of the phases (block 168). The processor 80 may then return to monitoring the power line for subsequent events (block 170).

By closing the ganged switching device at a time that reduces or minimizes the voltage difference between the energized power line and the trapped charge of the disconnected line, the IED 40 may reduce or minimize transient over-voltages during the three-pole close. By reducing over-voltages during the automatic reclose, the power line may be less likely to cause the arc to re-energize, thereby resulting in a more reliable power system.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An intelligent electronic device (IED) of a power system, comprising:
   a memory; and
   a processor operatively coupled to the memory, wherein the processor is configured to execute instructions stored on the memory to cause operations comprising:
   calculating a voltage amount associated with trapped charge of each phase of a power line based on voltage measurements of the power line;
   accounting for a ganged operational delay between phases of the ganged switching device, and
   sending a signal to close a ganged switching device at a time based at least in part on the trapped charge of each phase.

2. The IED of claim 1, wherein the processor is configured to execute instructions stored on the memory to cause operations comprising:
   determine a set of voltage differences between each phase voltage and the corresponding voltage amount of the trapped charge of that phase at a set of potential close point-on-waves (POWs);
   determine a maximum difference (DIF) from the set of voltage differences at each of the potential close POWs;
   selected a POW, from the potential close POWs, that results in a minimum value of DIF; and
   send a signal to close a ganged switching device at a time based on the selected POW.

3. The IED of claim 1, wherein the processor is configured to execute instructions stored on the memory to cause operations comprising calculating the voltage amount associated with trapped charge of each phase of a power line by summing voltage measurements over a cycle.

4. The IED of claim 1, wherein the signal to close the ganged switching device comprises a single signal that causes each of the phases to close.

5. The IED of claim 1, wherein the processor is configured to execute instructions stored on the memory to cause operations comprising using the ganged operational delay of:

$$GODLYB = \left(\frac{TCloseB - TCloseA}{1000} * NFREQ * 360\right) - (TCarcB - TCarcA)$$

where NFREQ is the nominal frequency, TClose is the switching close time of the A phase and the B phase of the ganged switching device, and TCarc is the arc time of the A phase and the B phase of the ganged switching device.

6. The IED of claim 1, wherein the processor is configured to execute instructions stored on the memory to cause operations comprising using a ganged operational delay of:

$$GODLYC = \left(\frac{TCloseC - TCloseA}{1000} * NFREQ * 360\right) - (TCarcC - TCarcA)$$

where NFREQ is the nominal frequency, TClose is a close time of the A phase and the C phase of the ganged switching device, and TCarc is the arc time of the A phase and the C phase of the ganged switching device.

7. A non-transitory, computer readable medium, comprising instructions configured to be executed by a processor to cause operations comprising:
calculating a voltage amount associated with trapped charge of each phase of a power line based on voltage measurements of the power line;
determining per-unit voltages of the power line from the voltage measurements;
integrating the per-unit voltages over a cycle to obtain the amount of trapped charge, and
sending a signal to close a ganged switching device at a time based at least in part on the trapped charge of each phase.

8. The non-transitory, computer-readable medium of claim 7, wherein the instructions are configured to be executed by the processor to cause operations comprising aligning B-phase point-on-wave and C-phase point-on-wave according to the A-phase.

9. The non-transitory, computer-readable medium of claim 7, wherein the instructions are configured to be executed by the processor to cause operations comprising calculating a set of maximum difference (DIF) values as:

DIF=max($|A-Q_A|$, $|B-Q_B|$, $|C-Q_C|$)

where A, B, and C are the per unit voltages of the A, B, and C phases at potential closing point-on-waves (POWs), $Q_A$, $Q_B$, and $Q_C$ are the per unit trapped charge of the A, B, and C phases, and max is a function that selects a maximum value.

10. The non-transitory, computer-readable medium of claim 9, wherein the instructions are configured to be executed by the processor to cause operations comprising selecting a closing POW from the potential closing POWs based on the time of the minimum DIF.

11. The non-transitory, computer-readable medium of claim 7, wherein the instructions are configured to be executed by the processor to cause operations comprising accounting for a ganged operational delay of at least one phase of the ganged switching device.

12. A method, comprising:
calculating, via an intelligent electronic device (IED), a voltage amount associated with trapped charge of each phase of a power line based on voltage measurements of the power line; and
sending, via the IED, a signal to close a ganged switching device at a time based at least in part on the trapped charge of each phase,
wherein the signal is a single signal to cause the phases of the power line to close together.

13. The method of claim 12, comprising:
normalizing the analog trapped charge amount to be between −1 per unit and 1 per unit; and
clamping any analog trapped charge amounts with a magnitude greater than 1.

14. The method of claim 12, comprising:
obtaining per-unit voltages from the voltage measurements; and
repeatedly summing the per-unit voltages over the preceding cycle to obtain an estimate of the trapped charge on each phase.

15. The method of claim 12, comprising accounting for a system phase rotation between each of the phases.

16. The method of claim 12, comprising:
determining a set of voltage differences between each phase voltage and the corresponding voltage amount of the trapped charge of that phase at a set of potential close point-on-waves (POWs);
determining a maximum difference (DIF) from the set of voltage differences at each of the potential close POWs;
selecting a POW, from the potential close POWs, that results in a minimum value of DIF; and
sending a signal to close a ganged switching device at a time based on the selected POW.

17. The method of claim 12, comprising setting the amount of trapped charge to zero after a predetermined period of time.

* * * * *